No. 667,432. Patented Feb. 5, 1901.
N. B. FASSETT.
BICYCLE.
(Application filed Mar. 19, 1898.)
(No Model.)
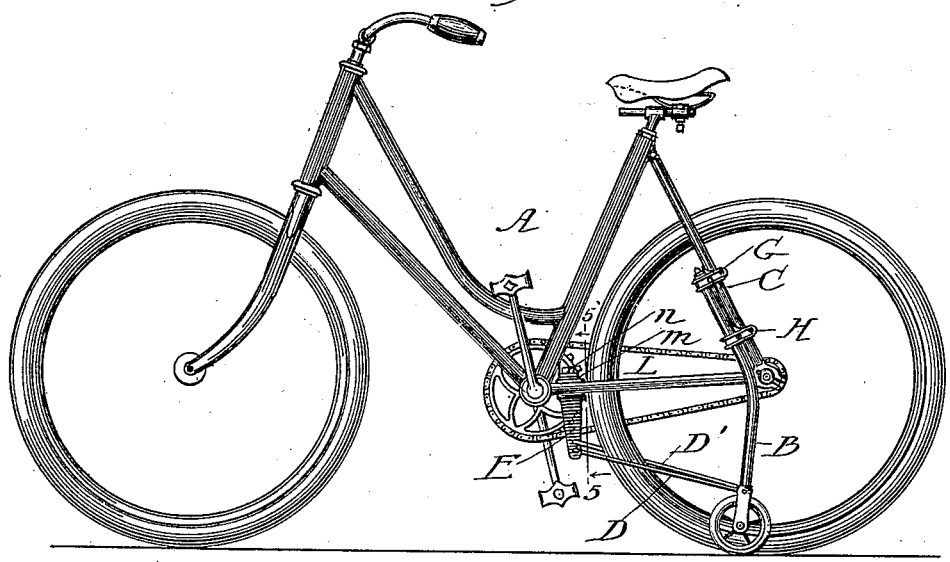
Fig. 1.
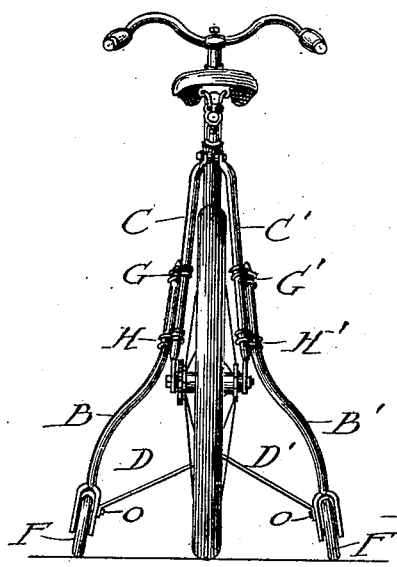
Fig. 2.
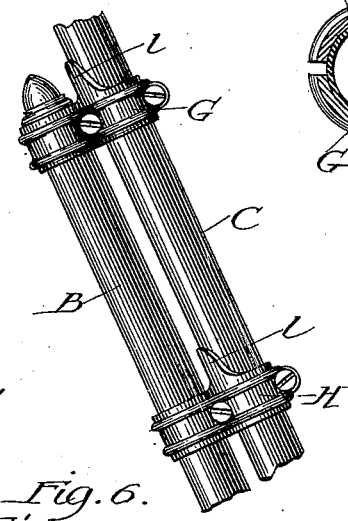
Fig. 3.
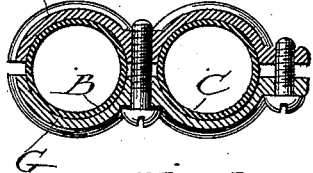
Fig. 4.
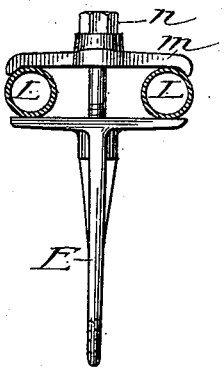
Fig. 5.
Fig. 6.
Witnesses:
Frank S. Blanchard
Clarence Cook.
Inventor:
N. B. Fassett

UNITED STATES PATENT OFFICE.

NELSON B. FASSETT, OF CHICAGO, ILLINOIS, ASSIGNOR, BY MESNE ASSIGNMENTS, TO B. A. FASSETT, OF SAME PLACE.

BICYCLE.

SPECIFICATION forming part of Letters Patent No. 667,432, dated February 5, 1901.

Application filed March 19, 1898. Serial No. 674,549. (No model.)

*To all whom it may concern:*

Be it known that I, NELSON B. FASSETT, a citizen of the United States, residing at Chicago, State of Illinois, have invented certain new and useful Improvements in Riding-Supports for Bicycles; and I do hereby declare that the following is a full, clear, and exact description thereof, reference being had to the accompanying drawings, making part of this specification.

My invention relates to improvements in riding-supports for bicycles, consisting of a safety attachment whereby the learner or rider may mount and ride a bicycle at leisure unaided and alone and without the danger of lateral tilting, either when the bicycle is at rest or when carrying a rider.

To this end my invention consists, primarily, of two ground-wheels, one on each side of the bicycle, adjacent to the rear wheel. The two wheels are journaled to two arms, respectively, which extend laterally and downwardly and are held rigidly to the frame of the bicycle by means of certain novel forms of attaching-clips, which enable the operator to attach the supports to or detach them from a bicycle at will, as hereinafter more specifically set forth.

This supporting device is intended to be used on any of the usual makes of bicycles and may be attached or detached by the mere use of a wrench and screw-driver, requiring only a few minutes of time. It is intended, furthermore, for the use of beginners and others who are for some reason unable to ride a bicycle without them.

In the accompanying drawings, Figure 1 is a side elevation of a bicycle, showing that part of my bicycle-support which is attached to the near side thereof, the other support being directly opposite, on the right-hand side of the wheel. Fig. 2 is a rear view of the same, showing the two supports complete and the mode of fastening them to the frame of the bicycle. Fig. 3 is an enlarged view showing in detail the novel features of my improved attaching-clips, their structure, and purposes, representing the mechanism shown from G to H in Fig. 2. Fig. 4 is an enlarged view of the two halves of the attaching-clips, clamping at its left-hand end one of the supporting-arms B and at the right-hand end clamping the bar C of the bicycle. Fig. 5 is an enlarged transverse section of the hanger and the mode of securing it to the lower rear fork of the bicycle. Fig. 6 shows the mode of fastening the front ends of the two stay-rods to the lower end of the hanger.

In the drawings, A represents the usual form of a bicycle, and B and B' the supporting-arms, attached to the diagonal bars C and C', respectively, of the rear upper fork of a bicycle-frame.

D and D' are two stay-rods for preventing their respective arms B and B' from swinging around backward out of place.

E, Figs. 1 and 6, is the hanger, to which the stay-rods are secured at their forward ends.

F and F' are two ground-wheels.

G and H and G' and H' are the four attaching-clips. Though similar in form, they differ in their location upon the bicycle-frame. These clips are each composed of two similar encircling parts or halves and are made to clamp firmly together in any relation required the supporting-arm B with the diagonal bar C of the rear fork by means of small screws, as shown in Figs. 3 and 4. They are also provided with wings projecting upwardly on the bars of the rear fork, their purpose being to increase the friction and prevent the supporting-arms from sliding upward when in use.

The hanger E is T-shaped, the upper horizontal portion being placed against the under side of the two horizontal bars L of the rear lower fork, just in front of the driving-wheel, its long end dropping vertically below, as shown in Fig. 1. Above the hanger and over the bars L is a clamping cross-piece *m*, through which passes a cap-screw *n* downward into the upper part of the hanger, by means of which the latter is firmly secured to the lower fork. The lower end of the hanger has two holes through it, one for each stay-rod, which is hooked to it at an interlocking position, as shown by the dotted lines in Fig. 6, and which when turned into its working position, as shown by the solid lines, cannot become accidentally disengaged therefrom.

The stay-rod D' (shown in Fig. 6) is for the right-hand side of the bicycle, the left-hand rod D (not shown in said figure) being hooked to the hanger in a similar manner, as shown in Figs. 1 and 2. These two stay-rods are preferably secured to their respective wheel-forks at the point o, and they, together with the supporting-arms, serve to hold the ground-wheels in a fixed position and distance relatively to the center of the driving-wheel. It is only by preference for this convenient form of construction that I have adopted this device for fastening the stay-rods to the lower end of the hanger, as some other mode of fastening might fulfil this purpose, and for this reason I do not wish to limit myself to that specific mode of fastening.

The clips, it will be seen, are so connected at one end to the supporting-arm and at the other end to the diagonal bar of the rear fork that the upper or straight portion of the supporting-arms may be carried around either forward or backward in order to cause the ground-wheels to run in parallel lines. It often happens in different bicycles that the diagonal bars C and C' do not always stand at the same angle with the ground-line, and as a consequence they do not always stand at the same angle with the straight portion at the upper end of the supporting-arms—that is, not in the same diagonal plane, but in a sort of winding plane, causing the arm and bar to slightly cross each other. By holding the upper clip, Fig. 1, with one hand and turning the lower clip with the other hand one way or the other around the bar C the two ground-wheels can be made to assume a position parallel with the line of travel. These clips, it will be seen, have a radial movement of one hundred and eighty degrees from front to rear around their respective bars C and C', thus permitting a backward movement of double the working length of one clip, the stay-rods being made longer or shorter to suit in either case. Furthermore, it should be noted that when moved half that distance, or ninety degrees, they will stand out at right angles to the plane of the bicycle, thus throwing the supporting-arms a greater distance apart, equal to the aggregate length of the two clips, one on each side of the bicycle. Some of these adjustments act an important part in the adaptation of my invention to the different makes of bicycles. Especially is this true as regards the ability to adjust the supporting-arms to bicycles having their rear forks standing at different angles from that required for the straight portion of the supporting-arms. The adjustable feature of the ground-wheels to a greater or less distance apart is also very important, for I have learned by actual experience that nervous and comparatively helpless persons in order to be more sure that the bicycle cannot tilt over require that the ground-wheels be set much farther apart than do persons of greater strength of body and limb. It will be seen from the above that these clips allow of five distinct separate adjustments of the supporting-arms—viz., first, an adjustment up and down the rear fork of the bicycle; second, an adjustment forward and backward; third, an adjustment nearer to or more remote from each other; fourth, an adjustment that will cause the ground-wheels to run in parallel lines, and, fifth, an adjustment that allows the upper or straight portion of the arms to be set at an angle that may be equal to, greater, or less than the angle at which the rear fork sets with reference to the ground-line. All these adjustments may be made independently and without the aid of the stay-rods, and if the supporting parts are made sufficiently strong the stay-rods may in many cases be dispensed with altogether, and hence I do not wish to make my invention of the adjustable clips and arms dependent upon the presence of the stay-rods.

These supports when first attached to a bicycle are so adjusted that when in use a wheel on one side only will touch the ground at a time, the other wheel being raised just high enough to miss the ground. Then as the learner becomes familiar with them in this position he may loosen the clips, raise the wheels a little higher from the ground, retighten them, and then begin to learn how to balance himself, and so on, from time to time, he may raise the wheels until they are no longer necessary for balancing purposes, when they may be discarded altogether. This adjustable feature of the arms separately up and down enables the rider to raise the left-hand wheel a little higher than the right-hand wheel in order to allow the bicycle to assume a vertical position on the right-hand side of an ordinary boulevard where the surface of the ground is a little sloping, being higher at the left-hand side of the bicycle than it is at the right-hand side. For this purpose in practice it is necessary to make the left-hand support a little shorter than the right-hand support, so as to be of equal height at their upper ends, though this difference in height and length is not shown in the drawings.

I claim—

1. In a riding-support for bicycles, the combination of four attaching-clips G, H, G' and H', each clip being independently connected to one of the bars of a bicycle-fork and adjustable both longitudinally and circumferentially thereof, two laterally and downwardly extending arms each secured to two of said clips and adjustable therein longitudinally and circumferentially of itself and ground-wheels carried by said arms whereby the arms are adjustable up and down forward and backward nearer to and more remote from each other at the same time allowing said ground-wheels to be set so as to revolve in parallel lines while portions of the arms may be set at the same or different angle from that of the fork of the bicycle, substantially as described.

2. In a riding-support for bicycles, the combination of four attaching-clips G, H, G', H', each clip being independently connected to one of the bars of a bicycle-fork, and adjustable both longitudinally and circumferentially thereof, two laterally and downwardly extending arms each secured to two of said clips and adjustable therein longitudinally and circumferentially of itself, ground-wheels carried by said arms, and stay-rods connecting the lower ends of said arms with a part of the bicycle-frame, whereby the arms are adjustable up and down forward and backward nearer to and more remote from each other at the same time allowing said ground-wheels to be set so as to revolve in parallel lines while portions of the arms may be set at the same or different angle from that of the fork of the bicycle, substantially as described.

3. In a riding-support for bicycles, the combination of attaching-clips each independently secured to and angularly adjustable on one of the bars of the bicycle, laterally and downwardly extending wheel-supporting arms secured to said clips and adjustable rotatably about their axes, wheels carried by said arms, and braces for holding said arms when adjusted, whereby the arms can be adjusted up and down forward and backward, nearer to and more remote from each other at the same time allowing said wheels to be set so as to revolve in parallel lines while portions of the arms may be set at the same or different angle from that of the fork of the bicycle, substantially as described.

4. In a riding-support for bicycles, the combination of attaching-clips each independently secured to and adjustable angularly and up and down on one of the bars of the bicycle, laterally and downwardly extending wheel-supporting arms secured to said clips and adjustable therein axially and rotatorily, wheels carried by said arms, and brace-bars for bracing said arms when adjusted, whereby the arms can be adjusted up and down forward and backward, nearer to and more remote from each other at the same time allowing said wheels to be set so as to revolve in parallel lines while portions of the arms may be set at the same or different angle from that of the fork of the bicycle, substantially as described.

NELSON B. FASSETT.

In presence of—
   EDW. A. SCRIBNER,
   C. M. BASSLER.